(12) United States Patent
Neyland

(10) Patent No.: US 9,678,229 B2
(45) Date of Patent: Jun. 13, 2017

(54) NEUTRON DETECTOR USING PROPORTIONAL COUNTERS

(71) Applicant: LND, Incorporated, Oceanside, NY (US)

(72) Inventor: Spencer B. Neyland, Oceanside, NY (US)

(73) Assignee: LND, INCORPORATED, Oceanside, NY (US)

( * ) Notice: Subject to any disclaimer, the term of this patent is extended or adjusted under 35 U.S.C. 154(b) by 0 days.

(21) Appl. No.: 14/724,008

(22) Filed: May 28, 2015

(65) Prior Publication Data

US 2015/0355345 A1    Dec. 10, 2015

Related U.S. Application Data

(63) Continuation of application No. PCT/US2015/022993, filed on Mar. 27, 2015.

(60) Provisional application No. 62/092,956, filed on Dec. 17, 2014, provisional application No. 61/971,157, filed on Mar. 27, 2014.

(51) Int. Cl.
*H01J 47/00* (2006.01)
*G01T 3/00* (2006.01)
*G01T 3/08* (2006.01)

(52) U.S. Cl.
CPC ............... *G01T 3/008* (2013.01); *G01T 3/08* (2013.01)

(58) Field of Classification Search
CPC .................................. G01T 3/008; G01T 3/08
USPC ........................................................ 250/385.2
See application file for complete search history.

(56) References Cited

U.S. PATENT DOCUMENTS

2012/0032091 A1    2/2012  Esin et al.
2012/0217406 A1*  8/2012  McGregor ............. G01T 3/008
                                                                250/361 R

FOREIGN PATENT DOCUMENTS

WO    WO 2011/019437 A1    2/2011
WO    WO 2011/025853 A1    3/2011

* cited by examiner

*Primary Examiner* — David Porta
*Assistant Examiner* — Meenakshi Sahu
(74) *Attorney, Agent, or Firm* — Scully, Scott, Murphy & Presser, P.C.

(57) ABSTRACT

A neutron detector module comprising a distribution of proportional counters positioned in a defined array. Each of the proportional counters includes a supply of a neutron sensitive gas for reacting with neutrons, and this reaction generates ionizing reaction products. The proportional counters include a multitude of tubes, and each of the tubes has a diameter between 0.50 inch and 1.00 inch. The neutron detector module comprises further a multitude of electrical conductors; and each of the conductors is positioned in one of the proportional counters, and the ionizing reaction products generate electric current pulses in the electrical conductors.

20 Claims, 13 Drawing Sheets

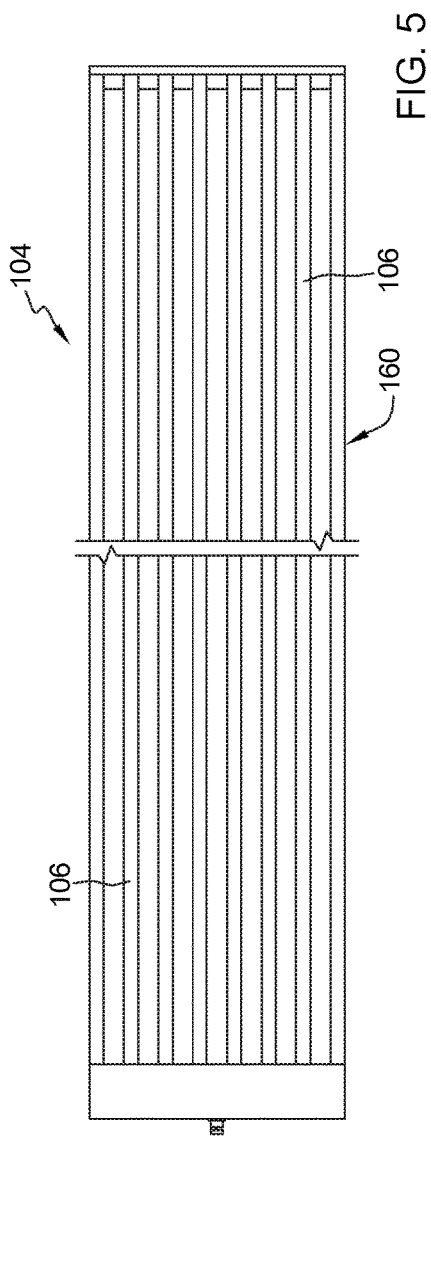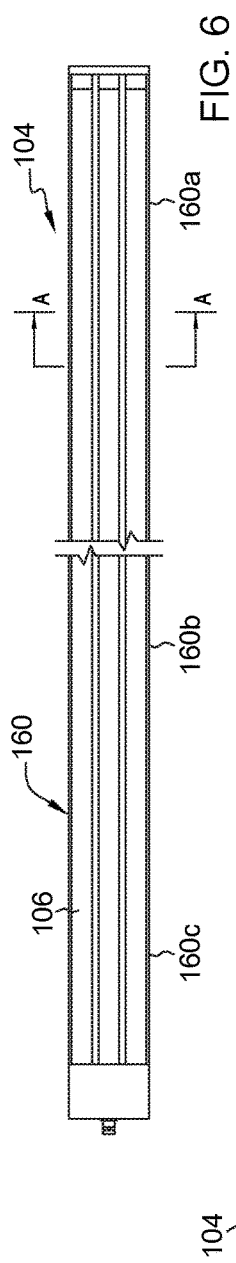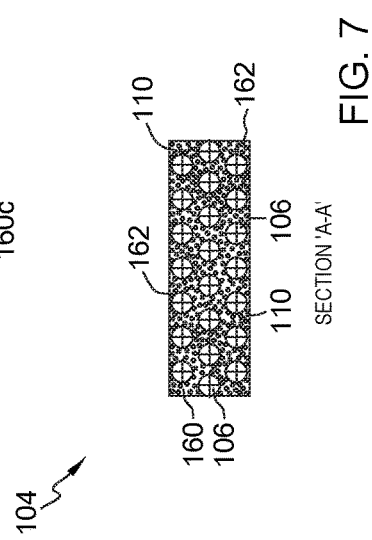

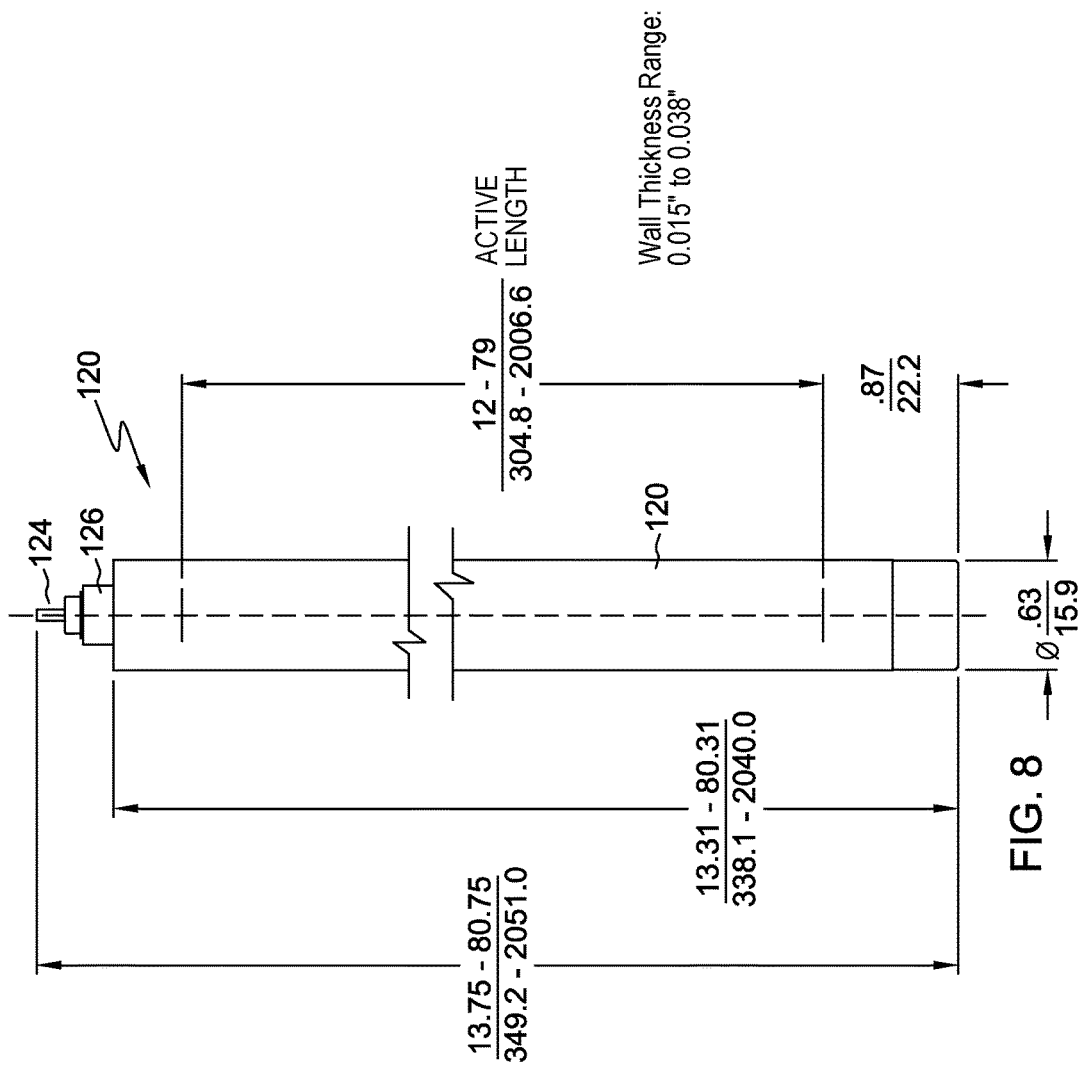

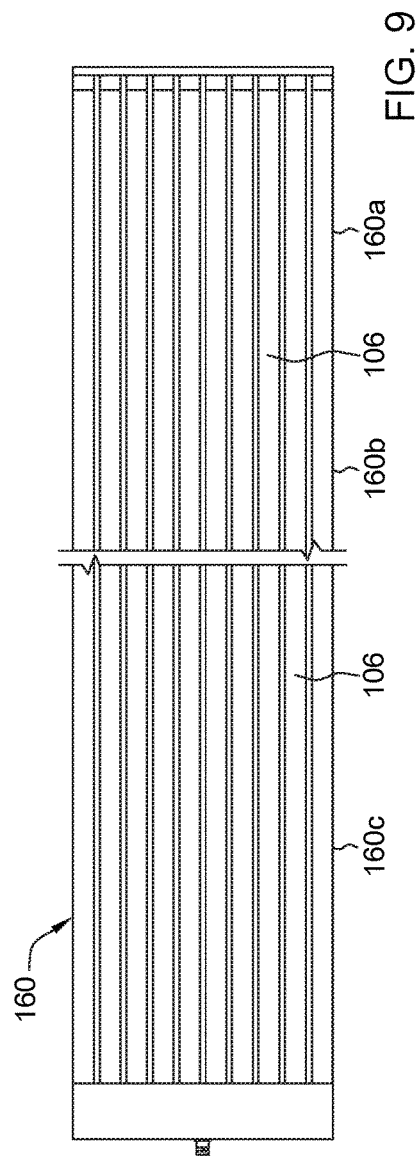
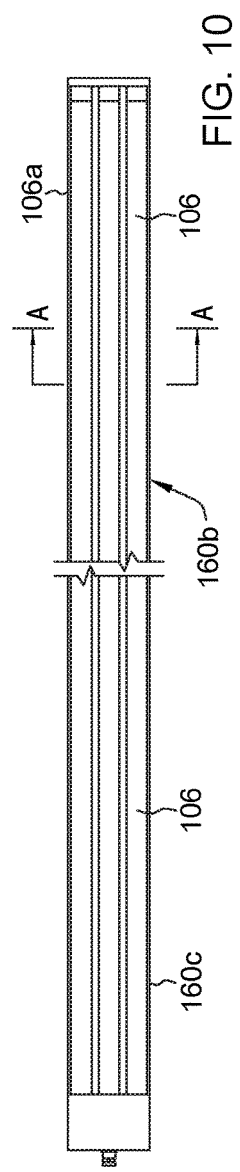
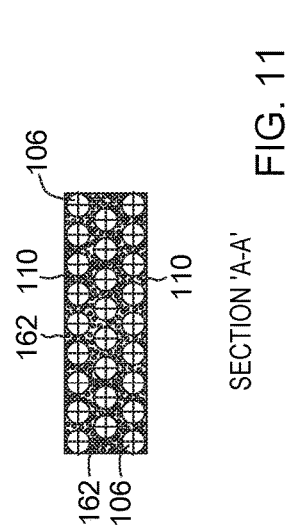

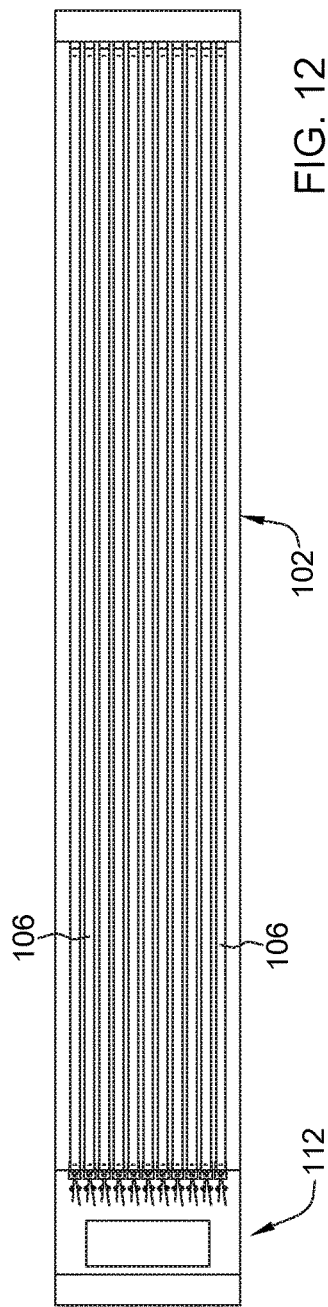
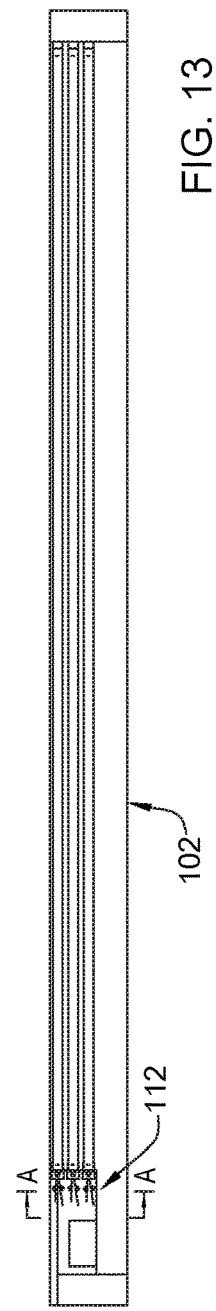
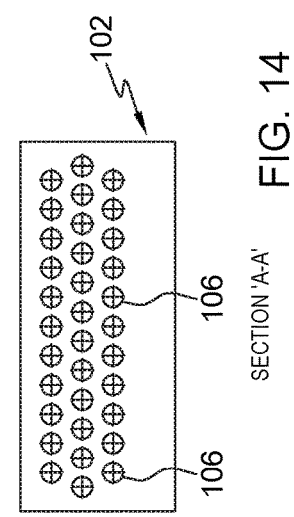

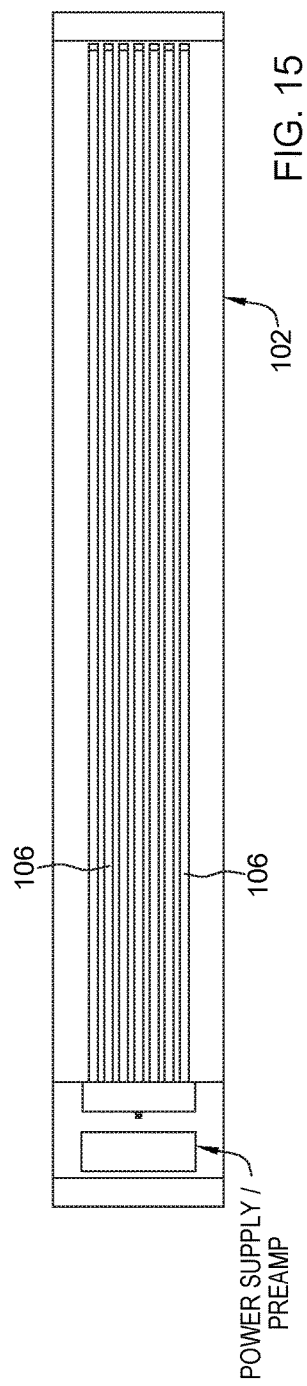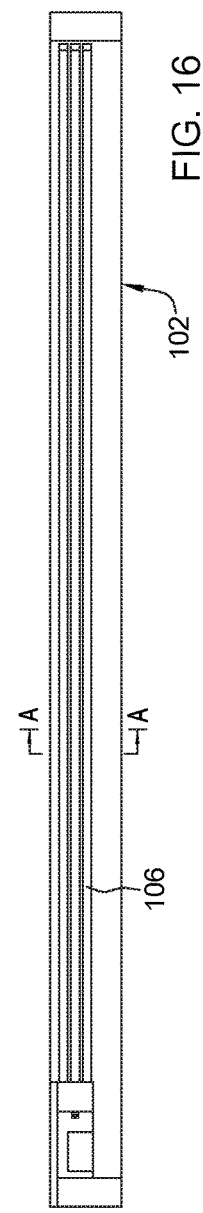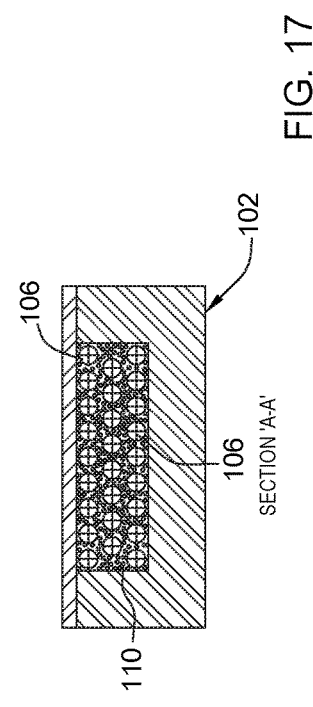

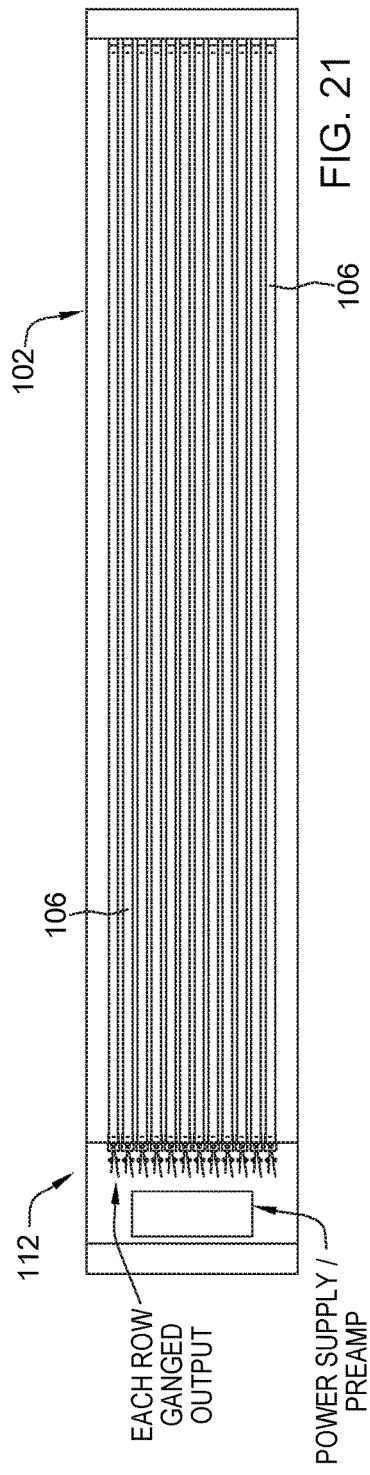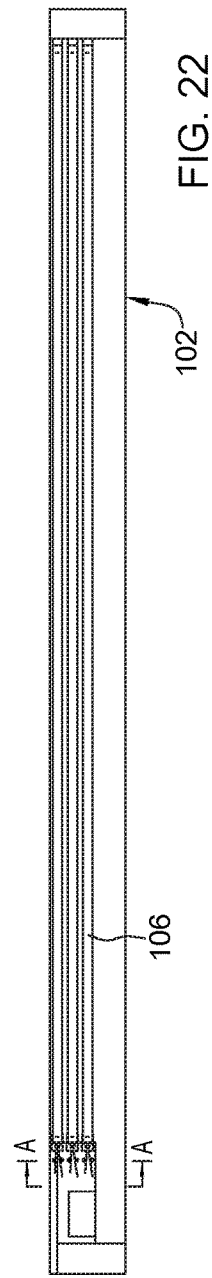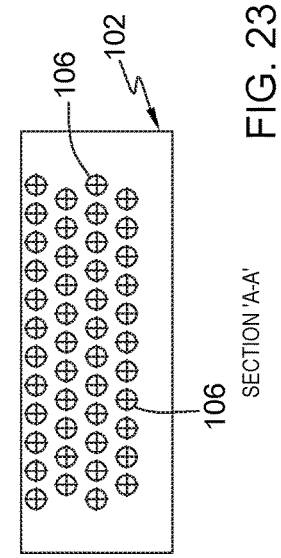

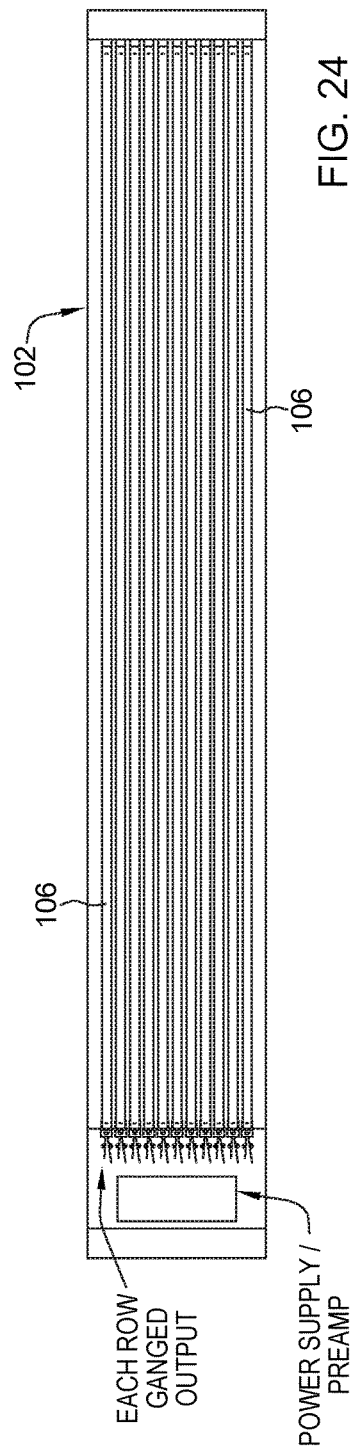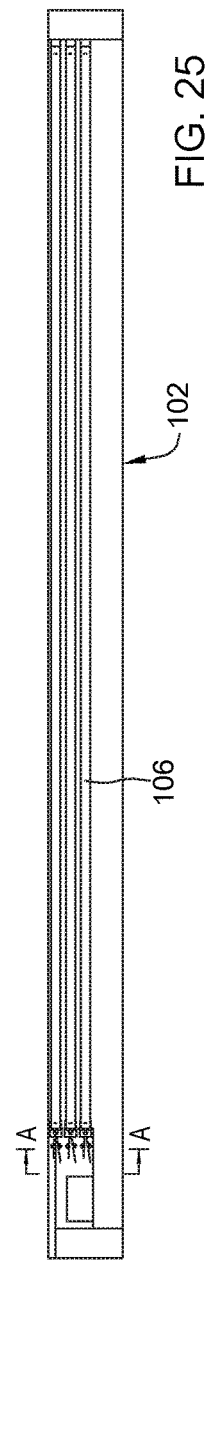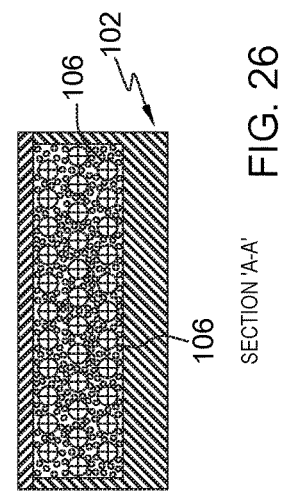

THE WATT FISSION SPECTRUM OF Cf-252

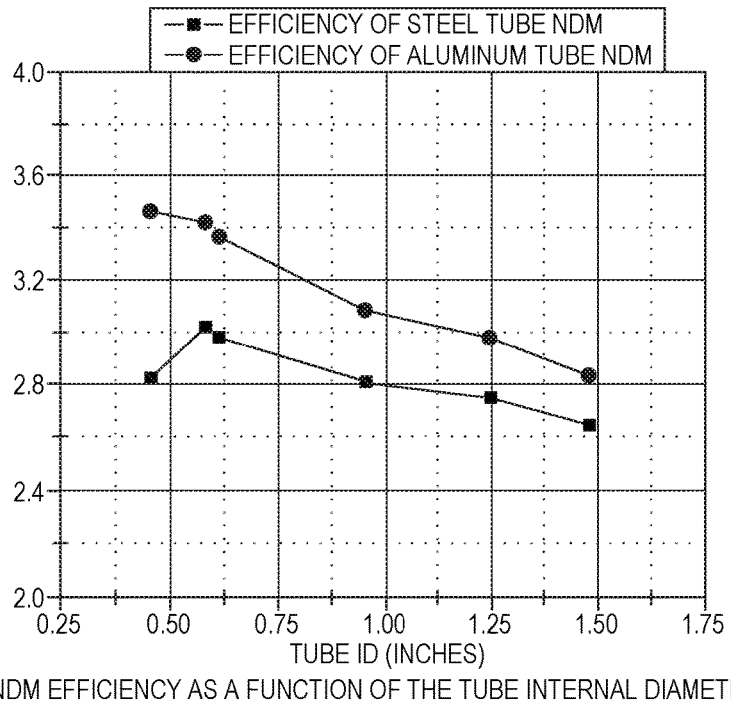
NDM EFFICIENCY AS A FUNCTION OF THE TUBE INTERNAL DIAMETER   FIG. 29
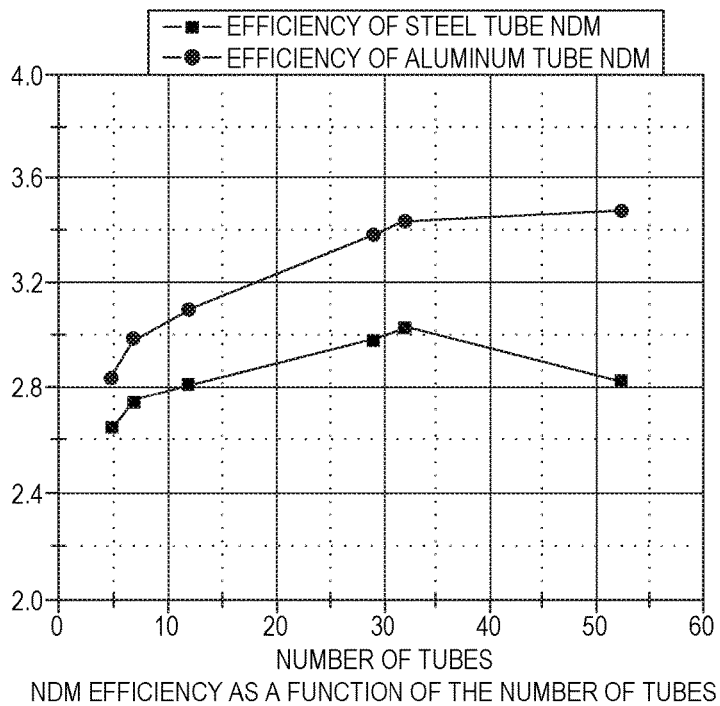
NDM EFFICIENCY AS A FUNCTION OF THE NUMBER OF TUBES   FIG. 30

NEUTRON DETECTOR USING PROPORTIONAL COUNTERS

CROSS REFERENCE TO RELATED APPLICATIONS

This application is a continuation of PCT application PCT/US2015/022993, filed Mar. 27, 2015, which claims the benefits of U.S. Provisional Patent Application Ser. No. 61/971,157, filed Mar. 27, 2014 and U.S. Provisional Patent Application Ser. No. 62/092,956, filed Dec. 17, 2014.

The entire contents and disclosures of PCT application PCT/US2015/022993, U.S. patent application Ser. No. 14/670,973, and U.S. Provisional Patent Application Ser. No. 61/971,157 and U.S. Provisional Patent Application Ser. No. 62/092,956, are hereby incorporated herein by reference.

BACKGROUND

This invention generally relates to neutron detectors, and more specifically, to neutron detectors using a neutron sensitive gas.

Neutron detectors are important in many applications including, among others, security, neutron measurements in industrial applications, and neutron physics. Neutrons do not have any electrical charge and thus are capable of passing through thick, protective shielding or concealing materials, and because of this, neutron detectors are used to detect concealed nuclear materials. At the same time, as neutrons have no charge, neutrons may not interact directly with electronic sensing devices, and as a result, neutrons may be very difficult to detect.

Until the 1980's $BF_3$ proportional counters were the standard in neutron detection. Although $BF_3$ proportional counters have been manufactured and used continuously for over 50 years, He-3 proportional counters were chosen for some applications because the gas was made available and because He-3 can be used at higher pressures. He-3, however, is a scarce material and it does not occur naturally. This makes the availability and future supply of He-3 detectors uncertain.

In a He-3 proportional counter, a neutron reacts with He-3 to produce a triton and a proton. These reaction products deposit their kinetic energy in the gas, creating ion pairs which separate in the electric field established in the detector where the electrons gain sufficient kinetic energy to ionize other gas molecules, thereby amplifying the electric signal, which results in a measurable current pulse at the output of the detector.

$BF_3$ proportional counters operate according to the same principles as He-3 proportional counters, except that the neutron sensitive material is the $^{10}B$ contained in the gas. Boron is a very good thermal neutron absorber due to the high absorption cross section of $^{10}B$, which has 19.8% abundance in the natural boron. Enriched Boron is readily available to increase the absorption probability further.

The thermal neutron interaction with $^{10}B$ is the (n,α) $^7Li$ reaction shown below.

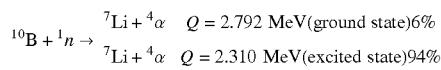

This interaction will release a total energy of 2.792 MeV with the reaction product $^7Li$ in the ground state or 2.310 MeV with the $^7Li$ in the excited state. The latter reaction will happen 94% of the time. $^7Li$ in the excited state will immediately decay to the ground state and release a gamma ray with energy of 0.48 MeV.

The large amount of energy released in the above reaction is shared by the $^7Li$ and alpha particles and can ionize matter and generate electronic signals in a detector. The most common use of the $^{10}B$ neutron reaction for neutron detection is in the $BF_3$ gas-proportional counter or a proportional counter with $^{10}B$ lined walls. The advantage of using $BF_3$ over $^{10}B$ lined walls is the greater intrinsic sensitivity of the detectors and the simplicity of the design. In order to approach the sensitivity of a $BF_3$ counter, $^{10}B$ lined tubes must employ complex geometries to increase the surface area of $^{10}B$ inside the tube volume or use many closely packed small diameter tubes or straws. This increases manufacturing costs and introduces unnecessary complexity into the design, which leads to a higher probability of failure.

BRIEF SUMMARY

Embodiments of the invention provide a neutron detector module, a method of operating a neutron detector module, and a neutron detector assembly. In one embodiment, the neutron detector module comprises a container, a distribution of proportional counters positioned in a defined array in said container, and a multitude of electrical conductors. Each of the proportional counters includes a supply of a neutron sensitive gas for reacting with neutrons, and this reacting generates ionizing reaction products. Each of the electrical conductors extends into one of the proportional counters, and the ionizing reaction products generated therein produce electric current pulses in the electrical conductors. In an embodiment, the proportional counters include a multitude of tubes, and each of the tubes has a diameter between 0.50 inch and 1.00 inch.

In an embodiment, the proportional counters are positioned in said defined array in a plurality of parallel rows, centers of the parallel rows are spaced apart between about 0.834 and 1.0 inch, and within each of the rows, centers of the proportional counters are spaced apart between about 0.896 inch and 1.063 inches.

In an embodiment, the neutron sensitive gas is $BF_3$, and the mass of the $BF_3$ gas in each of the proportional counters is equal to or less than one gram.

In an embodiment, the pressure in each of the proportional counters is equal to or less than 105 kPa (absolute) at 20° C.

In an embodiment, each of the tubes has a diameter between 0.63 inch and 0.69 inch.

In an embodiment, each of the tubes has a sidewall thickness between 0.015 inch and 0.038 inch.

In an embodiment, said multitude of tubes includes between 22 and 54 tubes.

In an embodiment, the neutron detector module further comprises a neutron moderator material inside said container for moderating neutrons in said container, and the neutron moderator material comprises pellets of the neutron moderator material positioned in the container, around the proportional counters.

In an embodiment, the neutron detector further comprises a base neutron moderator material inside said container for moderating neutrons in the container. The base neutron moderator material defines a multitude of longitudinal openings, and the proportional counters are held in said longitudinal openings in said defined array.

In an embodiment, the distribution of proportional counters is designed to drop into a standard neutron detection module (NDM) box with interior dimensions of 80 inches by 8 inches by 2.5 inches and sealed with a standard NDM box cover that comprises a ½ inch thick to ¾ inch thick sheet of HDPE. Larger or smaller moderator boxes may be used, including cylindrical geometries. The core may be constructed as an individual component. An aluminum box containing a distribution of proportional counters and solid HDPE or HDPE beads is one embodiment.

In an embodiment, the core is substantially free of neutron absorbing materials.

In an embodiment, the interiors of the tubes are substantially free of solid neutron absorbing materials.

Boron trifluoride proportional counters have a proven history, reliability, and high intrinsic sensitivity to thermal neutrons. Boron trifluoride proportional counters continue to be manufactured and used in diverse applications, from cosmic ray studies, power plant monitoring, nuclear medicine, and homeland security. The reactivity of the gas, and the presence of electronegative trace contaminates that limit the fill pressure of Boron trifluoride proportional counters, made He-3 detectors an attractive option because filling to much higher pressures is possible to achieve higher efficiencies, without a loss of proportional counter resolution.

There is continuing and urgent need for neutron detection systems, to search for and identify radiological threats. Matching of existing He-3 based detector performance has been demonstrated using $BF_3$ based detectors, and higher detection levels are possible in equivalent neutron detection module (NDM) form factors. $BF_3$ based detectors have excellent discrimination (better than He-3) against gamma rays and electronic noise because the Low Level Discriminator (LLD) in the signal processing electronics can be set higher than in competing technologies. Thus, where other systems may falsely indicate the presence of neutrons in elevated gamma environments, $BF_3$ detectors will not cause false neutron alarms.

BRIEF DESCRIPTION OF THE SEVERAL VIEWS OF THE DRAWINGS

FIG. 5 is a top plan view of a neutron detector assembly showing a distribution of the proportional counter that may be used in the module of FIG. 1.

FIG. 6 is a side view of the neutron detector assembly of FIG. 5.

FIG. 7 is a cross-sectional view of the neutron detector assembly of FIGS. 5 and 6, taken along A-A of FIG. 6.

FIG. 8 illustrates one of the proportional counters of the neutron detector assembly of FIGS. 1-4.

FIGS. 9-11 illustrate an alternate distribution of proportional counters, in which the proportional counters are arranged in three rows.

FIGS. 12-26 show distributions of proportional counters positioned in neutron detection module (NDM) boxes.

FIG. 29 is a graph showing the NDM efficiency as a function of the internal diameters of tubes in the module for both steel tubes and aluminum tubes.

FIG. 30 illustrates the NDM efficiency as a function of the number of tubes in the module for both steel and aluminum tubes.

DETAILED DESCRIPTION

Figure 1:
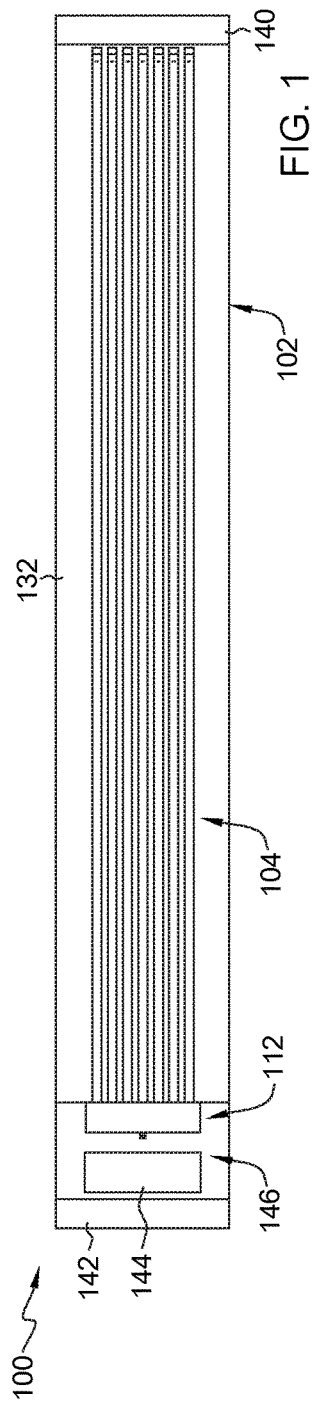
FIG. 1 is a top plan view of a neutron detector module embodying this invention.

Embodiments of the invention provide a neutron detector module, a method of operating a neutron detector module, and a neutron detector assembly. Multiple embodiments of the invention are disclosed herein, and this disclosure is provided in order to enable a person having ordinary skill in the art to practice the invention. The general principles and features described herein may be applied to other embodiments and applications without departing from the spirit and scope of the invention. Also, the terminology and phraseology used is for the purpose of describing exemplary embodiments. Thus, the present invention is to be accorded the widest scope encompassing numerous alternatives, modifications and equivalents consistent with the principles and features disclosed. For purpose of clarity, some features are not described or shown in detail so as not to obscure the present invention.

FIGS. 1-4 illustrate a neutron detection module 100 in accordance with one embodiment of the invention. Generally, module 100 comprises container or box 102, and a defined distribution 104 or array of proportional counters 106. The neutron detection module 100 of FIGS. 1-4 also includes a moderator material 110, electrical conductors 112, and support frames 114.

In the embodiment of FIGS. 1-4, the moderator material 110 comprises beads or pellets of, for example, high density polyethylene (HDPE). These beads fill the container 102, around the distribution of the proportional counters 106, and function as neutron moderator material. The proportional counters may be held in place by, for example, mounting suitable support frames 114 at the ends of the proportional counters, with additional support frames along the length of the proportional counters as may be needed. In other embodiments, the proportional counters may be positioned within a core of HDPE neutron moderator material that is formed with or provided with suitable openings for the proportional counters.

Each of the proportional counters 106 is filled with a neutron sensitive gas; and in the operation of the detector module 100, neutrons passing through the proportional counters interact with the gas in the proportional counters. This interaction results in electrical pulse signals in conductors 112, and the pulses in the conductors are collected and analyzed. Also, in the embodiment of FIGS. 1-4, the distribution of proportional counters includes a multitude of tubes, and each of the tubes has a diameter greater than 0.50 inch. As a more specific example, each of the tubes has a diameter between 0.50 inch and 1.00 inch.

Figure 2:
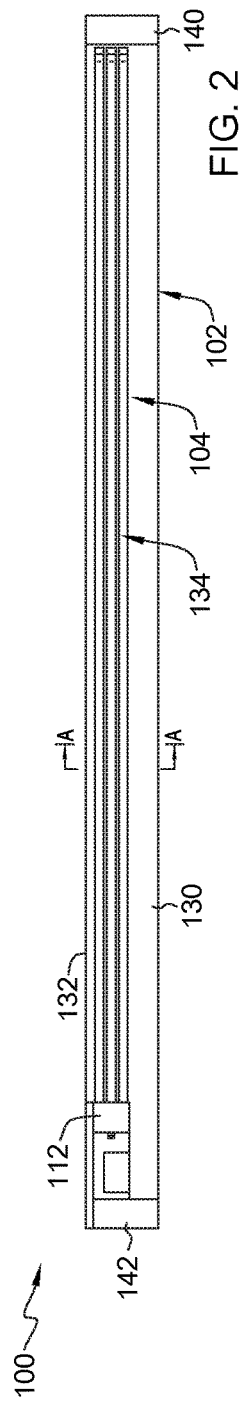
FIG. 2 is a side view of the neutron detector module of FIG. 1.
Figure 3:
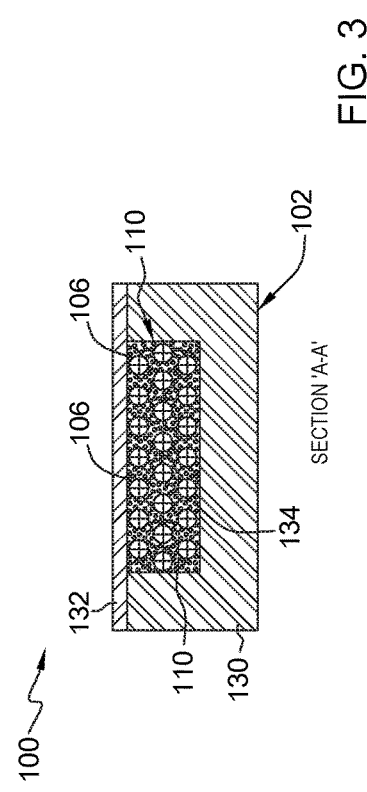
FIG. 3 is a cross-sectional view of the neutron detector module of FIGS. 1 and 2, taken along A-A of FIG. 2.
Figure 4:
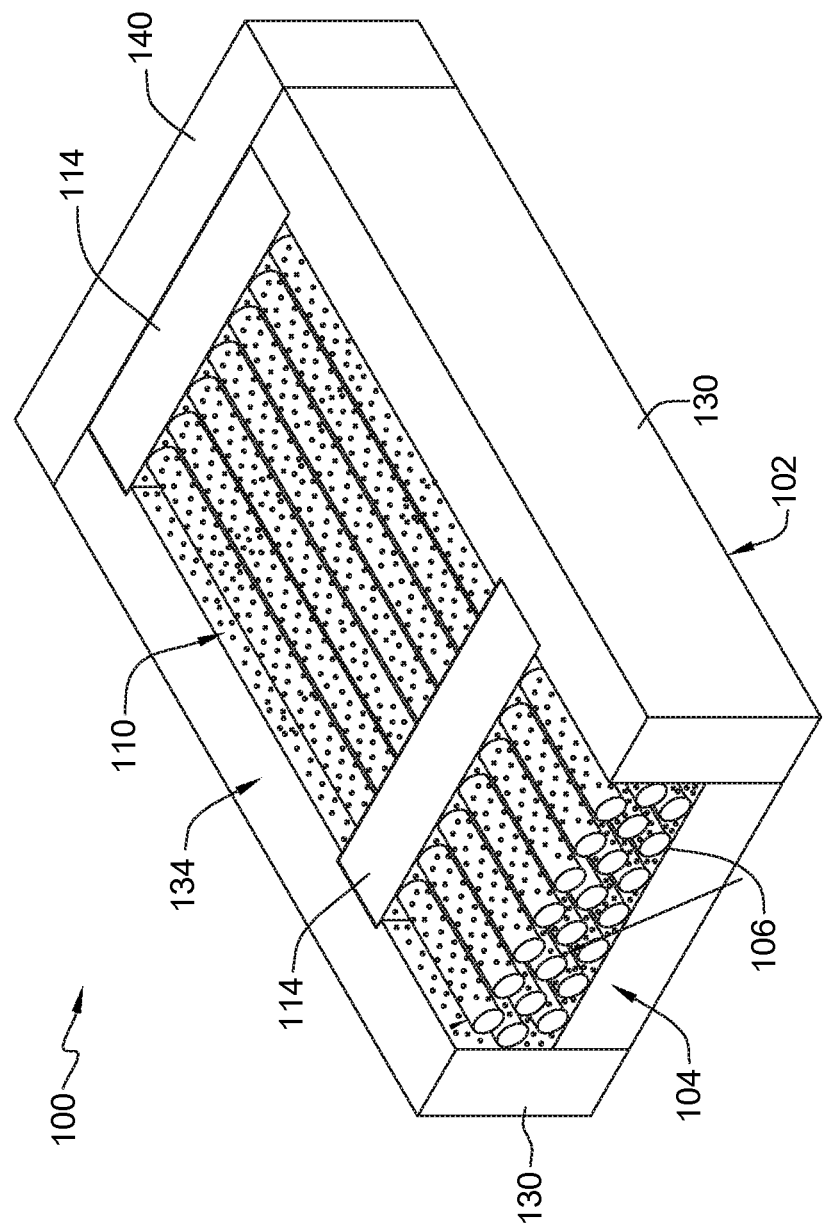
FIG. 4 is an orthogonal view of a cut section of the neutron detection module of FIGS. 1-3, with the cover of the module removed.

FIGS. 5-7 show in more detail a distribution of proportional counters 106 that may be used in the module of FIGS. 1-3. With the arrangement of the proportional counters illustrated in FIGS. 1-7, the proportional counters are arranged in three parallel rows. The centers of the parallel rows are spaced apart between about 0.834 inch and 1.0 inch; and within each row, the centers of adjacent counters are spaced apart between about 0.896 inch and 1.063 inch. This uniform spatial arrangement may be achieved by mounting the tubes at each end in support frame 114, with additional support frames along the length of the tubes as may be needed.

In an embodiment, the proportional counters 106 in each row are staggered, or offset, relative to the proportional counters in the adjacent row or rows. For example, each counter in the top and bottom rows is laterally located midway between two of the counters of the middle row. In an embodiment, this offset between the proportional counters of adjacent rows is between one-half and five-eighths inch.

As will be understood by those of ordinary skill in the art, in different embodiments of the invention, module 100 may be provided with different numbers of the proportional counters, and modules may be provided with any suitable number of proportional counters over a wide range of numbers. For example, with some embodiments, the module may have 22, 26 or 28 proportional counters. In other embodiments, the module may be provided with 17, 24 or 54 tubes. Other embodiments may have more or fewer proportional tubes than those expressly described herein.

Any suitable proportional counters 106 may be used in this invention. For example, the proportional counters may comprise tubes, and FIG. 8 shows in more detail, a tube 120 that may be used in embodiments of the invention. In an embodiment of the invention, the body 122 of the tube is slightly shorter than the module 100, and in one example, the body of the tube is 73.31 inches. In embodiments of the invention, the diameter of the tube is between 0.50 inch and 1.0 inch; and as a more specific example, the diameter of the tube may be between 0.60 inch and 0.69 inch. In the specific example shown in FIG. 8, the diameter of the tube is 0.63 inch, and the thickness of the wall of tube 40 is between 0.015 inch and 0.038 inch. The tube body 122 may be made of any appropriate material, and as examples, the tube body may be stainless steel, aluminum, copper or copper alloy.

An anode wire 124 axially or longitudinally extends through the tube 120. In an embodiment, the anode wire is centrally located in the tube and is secured at or adjacent to both ends of the tube. A brazed ceramic insulator with a metal cap 126 is secured at one end of the tube, sealing this end of the tube, with the anode wire 124 extending through the cap.

Each tube 120 of the distribution 104 is filled with a neutron sensitive gas, and this gas may be mixed with other gases. In an embodiment, each tube holds one gram or less of $BF_3$. The $BF_3$ is $^{10}B$ enriched, and in an embodiment, the $BF_3$ is enriched to contain at a minimum 96% $^{10}B$. Other gases, such as argon or methane, may also be contained in the tube, and the pressure in the tube may be, for example, a maximum of 105 kPa absolute at 20° C.

After the anode wire 124 is secured in a tube 120 and the tube is filled with the desired gas or gas mixture, the tube is hermetically sealed. Any suitable procedure may be used to do this. As mentioned above, a brazed ceramic insulator with a metal cap 126 may be used to close one end of the tube, with the anode wire 124 extending through that cap to the exterior of the tube while a copper tubulation may be used on the other end to vacuum process the tube before back-filling with the operational gases and sealed by cold-welding by applying a hydraulic pinch off tool.

With the embodiment of FIG. 8, the distance between the top of wire 124 and the bottom of the tube is between 13¾ inches and 80¾ inches, and the length of the tube body 120 is between 13.31 inches and 80.31 inches. The tube has an active length between 12 inches and 79 inches, and the distance between the bottom of this active length and the bottom of the tube is approximately 0.57 inch. The outside diameter of the tube is 0.63 inch, and the wall thickness of the tube is between 0.015 inch and 0.038 inch.

With reference to FIGS. 1-4, in an embodiment, containers or box 102 is made of a neutron moderator material, and in an embodiment, the moderator material of box 102 extends around and substantially encloses proportional counters 106. In one embodiment, the box 102 is formed from a high density polyethylene and is comprised of a main section 120 and a cover section 132. Main section 130 has a U-shaped cross section, and proportional counters 106 are positioned in an interior recess or space 134 formed by this main section.

In embodiments of the invention, box 102 is a standard neutron detection module (NDM) box used in a radiation portal monitor (RPM). With the embodiment shown in FIGS. 1-4, the NDM box 102 has a width of twelve inches, and a height of five inches. The interior recess 134 of the moderator material is eight inches wide and two and one-half inches high. As will be understood by those of ordinary skill in the art, embodiments of the invention may be used with NDM boxes having other dimensions, and may be used with other types of enclosures.

Cover 132 extends across and is secured to U-shaped section 130, enclosing proportional counters 106 within the box 102. In an embodiment, the length and width of the cover 132 match the length and width, respectively, of U-shaped section 130. Also, as an example, the cover may have a thickness or height of about one-half inch. End caps or plates 140 and 142 may be secured at the ends of the NDM box 102 to close those ends.

Preamp modules 144 or other electronics may be located in detector module 100, in an area 146 between proportional counters and an end of NDM box 102, and these modules are connected to the anode-lead wires 44 extending from tubes 120 to obtain the desired readout of the detected neutron reactions in those tubes.

With the embodiment shown in FIGS. 1-3, the NDM box has a length between 19 inches and 84 inches, the length of the interior of the box, between end caps or plates 140 and 142, is between 15 inches and 80 inches, and the length of the proportional counters is between 8¼ inch and 73¼ inches. Each of the end caps 140 and 142 has a thickness of 2 inches. The cover plate of the NDM box has a thickness of ½ inch to ¾ inch, the NDM box has a width of 12 inches, and the height of the NDM box is 5 inches. The interior cavity or recess in the NDM box has a height of 2½ inches and a width of 8 inches. The center-to-center distance between two adjacent tubes in a row is 1.063 inches, the center-to-center vertical distance between adjacent rows is 0.834 inch, and the center-to-center vertical distance between the top and bottom rows is 1.668 inches. The centers of the tubes in the top row are 0.416 inch below cover 132.

With the embodiment of FIGS. 5-7, the proportional tubes have a length between 15 inches and 80 inches; and the array of tubes has a height of approximately 2.47 inches and a width of approximately 7⅞ inches. The center-to-center spacing between two adjacent tubes in a row is 1.063 inches, and the center-to-center vertical distance between adjacent rows is 0.834 inch. The center-to-center horizontal offset between the tubes of adjacent rows is 0.420 inch.

Any suitable pellets or beads of moderator material 110 may be used in embodiments of the invention. As an example, the moderator material may be HDPE. The pellets may have irregular shapes, and may be of various shapes and sizes.

As mentioned above, neutron detection module 100 may include an alternate internal moderator comprised of a core of neutron moderator material that is formed or provided with suitable core openings for proportional counters 106. In embodiments of the invention, proportional counters are positioned in these core openings.

In an embodiment of the invention, this core is comprised of HDPE. Also, in an embodiment, the core is comprised of a series of individual segments. Each of the segments defines a multitude of longitudinal segment openings; and in the detector module 100, the core segments are arranged in series, adjacent to each other, with the longitudinal openings (will seal off end of HDPE) of the segments aligned to form the longitudinal openings of the core. Larger or smaller moderator boxes may be used, including cylindrical geometries. The core may be constructed as an individual component.

The core segments may be formed and assembled together in any suitable way. For instance, each segment may be formed from a solid block of HDPE or graphite, and the through openings in the segment may be drilled through the segment, or the core may be formed from layers with molded or machined contours. The core may be formed of HDPE beads. Between 100 and 300 grams of activated alumina or activated charcoal may be blended with the beads.

In an embodiment, the core has a generally cube shape, is between about 70 and 75 inches long, has a width between six and ten inches, and a height between two and three inches. As a more specific example, the core length may be 73.25 inches, the width of the core may be 7.5 to 8 inches, and the height of the core may be two and a half inches.

Proportional counters 106 may be positioned and arranged in module 100 in a variety of ways. For example, with an alternate distribution, the proportional counters 106 may be arranged in three parallel rows, with the top and bottom rows including ten counters each, and with the middle row including nine counters. The counters are uniformly spaced apart in the core, and the counters in the middle row are staggered relative to the counters in the top and bottom rows. This uniform spatial arrangement may be achieved by mounting tubes at each end in a support frame, with additional support frames along the length of the tubes as needed.

FIGS. 9-27 depict further alternate arrangements of the proportional counters that may be used in embodiments of the invention. In the embodiments of FIGS. 9-18, the tubes are arranged in three parallel rows. FIGS. 12-27 show the distribution of proportional counters positioned in a neutron detection module (NDM) box.

In the embodiment of FIGS. 9-11, the top and bottom rows each include nine tubes and the middle row includes eight tubes. FIG. 11 is taken along line A-A of FIG. 10.

With the embodiment of FIGS. 9-11, the proportional tubes have a length between 15 inches and 80 inches, and the array of tubes has a height of approximately 2.47 inches and a width of approximately 7⅞ inches. The center-to-center spacing between two adjacent tubes in a row is 0.896 inch, and the center-to-center vertical distance between adjacent rows is 0.834 inch. The center-to-center horizontal offset between tubes of adjacent rows is 0.448 inch.

The embodiment of FIGS. 9-11 includes a core 160 of neutron moderator material that is formed or provided with suitable core openings 162 for proportional counters 106. The core 160 has a generally cube shape and is designed to fit in, or drop in, an NDM box with the proportional counters positioned in the core. In an embodiment, this core is comprised of HDPE.

In an embodiment, the core is comprised of a series of segments, represented at 160a, 160b and 160c. Each of the segments is a block of HDPE material and defines a multitude of longitudinal through openings, and the core segments are arranged in series, adjacent to each other, with the longitudinal openings of the segments aligned to form openings 162 of the core.

FIGS. 12-14 illustrate an embodiment in which the top and bottom rows include eleven tubes, and the middle row includes twelve tubes. FIG. 14 is taken along line A-A of FIG. 13. These Figs. show the proportional counters in a NDM box.

With the embodiment of FIGS. 12-14, the NDM box has a length between 19 inches and 84 inches, a width of 12 inches, and a height of 5 inches. The center-to-center spacing between adjacent tubes in a row is 0.948 inches, and the center-to-center vertical distance between adjacent rows is 1.00 inch. The top row of the tubes is 0.672 inch from the top of the NDM box. The tubes in the top row are spaced apart 0.292 inch, and the top row of tubes is 0.344 inch above the middle row of tubes. The centers of the tubes in the bottom row are horizontally offset 0.474 inch from the centers of the tubes in the middle row. The center of the leftmost tube in the top row is 1.26 inches from the left end of the NDM box. Also, the distance between a tube in the top row and the neighboring tube to the left in the middle row is 0.451 inch.

FIGS. 15-17 show an alternate embodiment, where the top and bottom rows of proportional tubes include nine tubes and the middle row includes eight tubes. FIG. 17 is taken along line A-A of FIG. 16.

With the embodiment of FIGS. 15-17, the NDM box has a length between 19 inches and 84 inches, a width of 12 inches, and a height of 5 inches. The cover of the box has a thickness of ½ inch. The center-to-center spacing between adjacent tubes in each row is 0.896 inch, and the center-to-center vertical distance between adjacent rows is 0.834 inch. The centers of the tube in the bottom row are horizontally offset 0.448 inch from the centers of the tubes in the middle row. The tubes in the top row are spaced apart 0.240 inch, the top row of tubes is spaced 0.178 inch above the middle row, and the centers of the tubes in the top row are 0.416 inch below the cover of the NDM box. The distance between a tube in the top row and the neighboring tube to the left in the middle row is 0.291 inch.

Figure 18:
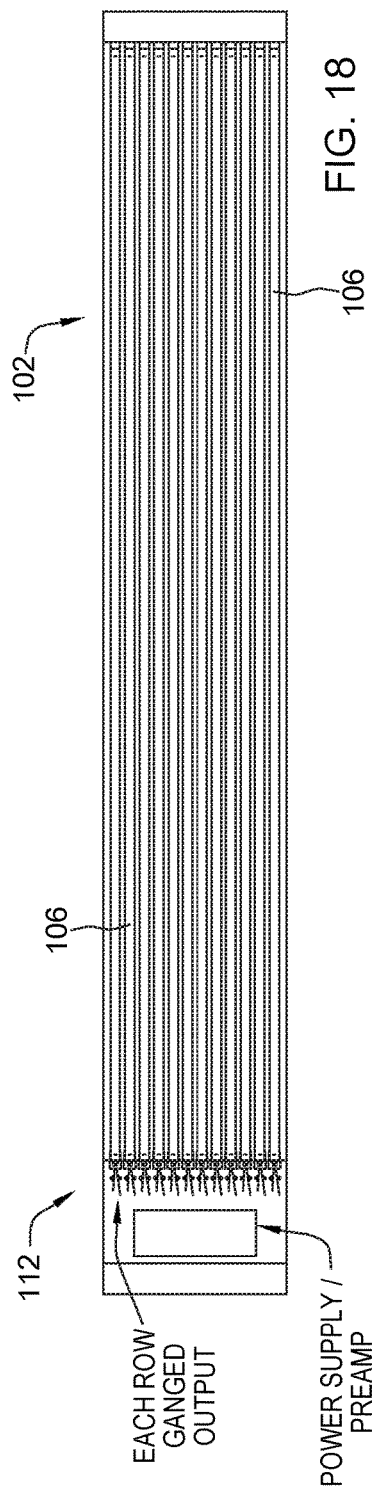
Figure 19:
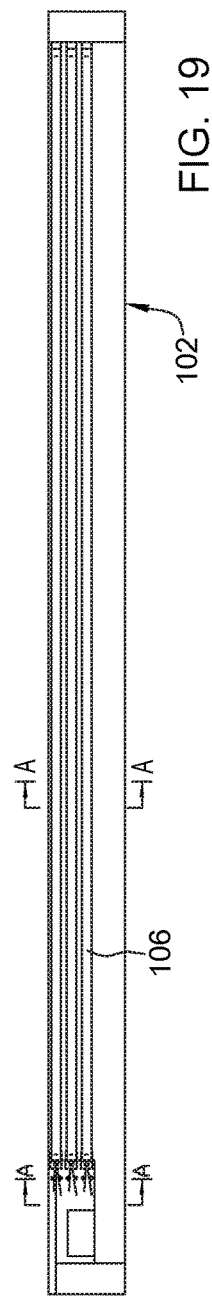
Figure 20:
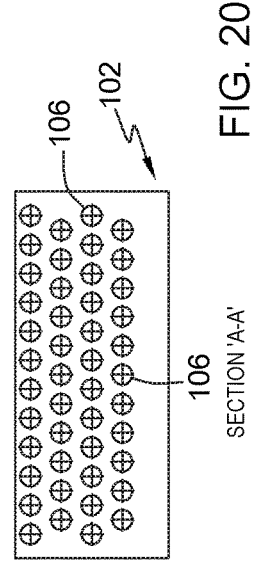
Figure 27:
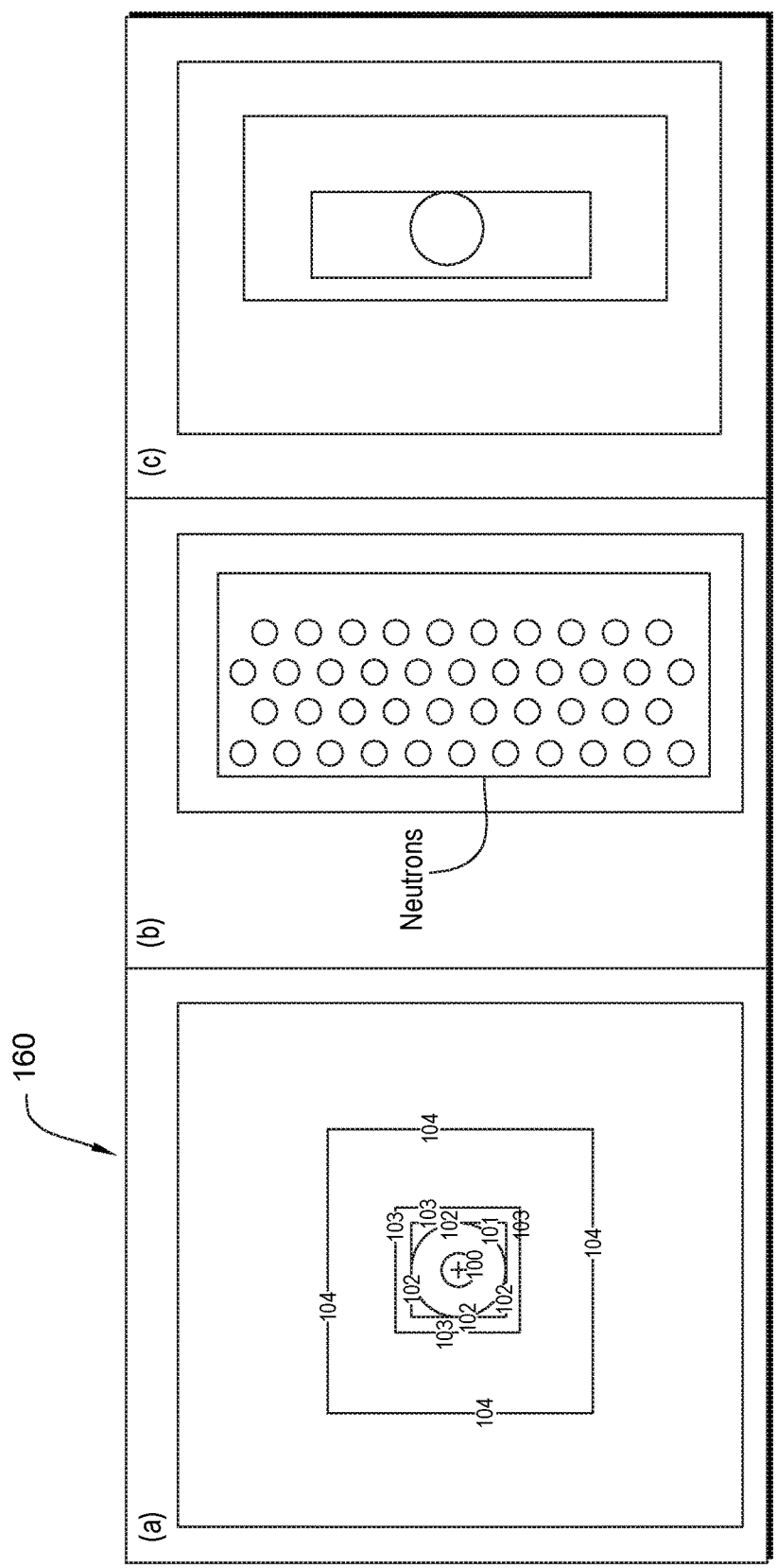
FIG. 27 shows a model used to simulate embodiments of the invention.

FIGS. 18-20 show an alternate embodiment that uses 46 proportional counters in a 12 inch wide NDM box. In this embodiment, the proportional counters are distributed in four parallel rows, and the centerlines of the rows are spaced apart 1.0 inch, FIG. 20 is taken along line A-A of FIG. 19.

With the embodiment of FIGS. 18-20, the NDM box has a width of 12 inches and a height of 5 inches. The center-to-center spacing between adjacent tubes in a row is 0.948 inch, and the center-to-center vertical distance between adjacent rows is 1.00 inch. The centers of the tubes in the second and fourth rows from the top are horizontally offset 0.474 inch from the centers of the tubes in the top row and the third row from the top. The top row of tubes is 0.344 inch above the second row of tubes from the top. The centers of the tubes at the left ends of the first and third rows of tubes from the top are 1.79 inches from the left side of the NDM box.

The embodiment of FIGS. 21-23 is similar to the embodiment of FIGS. 18-20; however, with the embodiment of FIGS. 21-23, the NDM box has a width of 14 inches. In the embodiment of FIGS. 21-23, the center-to-center spacing between adjacent tubes in a row is 0.948 inch, and the center-to-center vertical distance between adjacent rows is 1.00 inch.

FIGS. 24-26 show an alternate embodiment including 46 proportional counters in a 12 inch wide NDM box. In this embodiment, the NDM box has a height of 5 inches, and the tubes are positioned in the box in an array having a width of 11¼ inches and a height of 3 inches. The proportional counters are distributed in three parallel rows, with eleven tubes in the top and bottom rows and twelve tubes in the middle row. The center-to-center spacing between adjacent tubes in a row is 0.948 inch, and the center-to-center vertical distance between adjacent rows is 1.00 inch. The centers of the tubes in the middle row are horizontally offset 0.474 inch from the centers of the tubes in the top and bottom rows. The tubes in the top row are spaced apart 0.292 inch, and the top row of tubes is spaced 0.344 inch above the middle row. The top row of tubes is spaced 0.672 inch below the top outside surface of the NDM box, and the distance between a tube in the top row and the neighboring tube to the left in the middle row is 0.451 inch.

With reference to FIGS. 1-8, to assemble the neutron detector module 100, anode wires 124 are positioned in tubes 120, the tubes are filled with the desired gas, and the tubes are hermetically sealed. The tubes are fixed in a support frame and placed in the moderator material section 130, and the area around the tubes is filled with HDPE beads 110, filling the entire U shaped cavity 134. Electronic preamp modules 144 are positioned in the area 140 of the detector module and connected to the anode wires. A lid 132 with a gasket is installed over the NDM, and the NDM is hermetically sealed.

Alternatively, the tubes may be placed in openings of HDPE core, and the HDPE core is positioned in NDM box 102.

Embodiments of the invention may be used in a wide range of specific applications. For example, embodiments of the neutron detector module may be used in homeland security applications where there is a need to detect spontaneous fission sources, such as plutonium and uranium, which may be smuggled in large cargo containers. The energy spectrum of neutrons emitted by these sources peaks between 0.5 and 1.0 MeV, with a significant tail up to 10 MeV.

The detection of such high energy neutrons is commonly achieved with slow neutron detectors surrounded by a moderator, a hydrogen-rich material like polyethylene ($C_2H_4$). Thermal neutron detectors, typically based on neutron reactions with $^{10}B$, or $^3He$, as discussed above, have high detection efficiency for slow neutrons (<0.5 eV) but the probability of capturing neutrons with energies higher than a few keV is very low, and drops continuously with increasing energy. Fast neutrons entering the moderating material collide with hydrogen atoms, losing much of their kinetic energy, and they can subsequently be captured, with high efficiency, inside the detector. An important advantage of embodiments of this invention is that the total moderator thickness can be great enough to give a high probability of slowing down fast neutrons, while the distance that the thermal neutrons must diffuse to reach and interact with the $BF_3$ is kept short. In embodiments of the invention, the moderator thickness between the proportional counters is in the range of 0.20 inches to 0.45 inches. Furthermore, interference effects between closely spaced large diameter tubes are eliminated or substantially reduced by the geometry of the aggregate detector. There is a preferred diameter for the tubes which avoids losses in efficiency due to the wall effect, while realizing significant gains in efficiency over systems containing larger diameter detector tubes with an equivalent volume of Boron trifluoride per system.

The aggregate detector acts as a window to neutrons which would otherwise be absorbed parasitically in the moderator material resulting in higher detection efficiency due to the increased probability of detecting moderated neutrons diffusing back toward the direction of incidence. In embodiments of the inventions, it is not necessary to use solid moderator material between the proportional counters, as inexpensive, irregularly shaped HDPE pellets will suffice. In one embodiment of this invention, the efficiency of an NDM with a single 3-atmosphere 2 inch diameter $^3He$ proportional counter is achieved with no moderator between the detectors, and with a total of 22 grams of $BF_3$. It should be noted that where solid moderator is used, or a combination of solid sections and pellets is used, even higher efficiencies can be achieved, including efficiencies that exceed NDM's with three 3-atmosphere 2 inch diameter $^3He$ detectors. Furthermore, in embodiments of the invention, the anode wire diameter and fill pressure of the neutron detectors allows for a lower operating voltage, in the range of 1300 volts.

Embodiments of this invention may be used, for example, in a portal or gantry configuration in which one or more neutron detector modules are placed above, below or on either side of a gate area through which objects or vehicles under inspection pass. Square or cylindrical embodiments of this invention may be used for other kinds of nuclear assay scanning.

In this configuration, any neutrons emitted from an object being inspected pass through the tube detectors. If a neutron reacts with a $^{10}B$ nucleus in the gas in one of the tubes, the nucleus is converted into two charged particles, a $^7Li$ and an a particle. These two emitted particles ionize the gas, thereby creating free ions and electrons. A voltage placed across the tube causes the electrons and ions to drift apart, with the electrons drifting toward the anode and the positive ions drifting towards the cathode. As these charged particles, or charge carriers, move through the tube, they induce current to flow in the anode. This current, or change in current, can then be amplified and outputted to signal processing electronics by an indication that a neutron interaction occurred in the tube.

Experimental Results

Experiments and simulations were conducted to compare the sensitivity of embodiments of this invention to a standard NDM module using (1), (2), or (3) Helium-3 neutron detectors filled to 3 atmospheres. MCNP modeling was conducted to evaluate the effect of tube diameter and spatial distribution on the efficiency of the neutron detection models. A summary of the results shows the following:

The embodiment in FIGS. 1-3 exceeds the efficiency of a (1) He-3 NDM by 9% using stainless steel proportional counters and by 31% using aluminum proportional counters.

The embodiment in FIGS. 15-17 using aluminum proportional counters, and the embodiment in FIGS. 12-14 using stainless steel proportional counters, match the efficiency of a (2) He-3 NDM.

The embodiment in FIGS. 12-14 using aluminum proportional counters matches the efficiency of a (3) He-3 NDM.

The embodiment in FIGS. 21-23 exceeds the efficiency of a (3) He-3 NDM by 16% using stainless steel proportional counters, and by 34% using aluminum proportional counters.

The embodiment in FIGS. 18-20 exceeds the efficiency of a (3) He-3 NDM by 23% using aluminum proportional counters.

Initial testing of a full-sized prototype of an embodiment of the invention was carried out in July of 2013 to compare its sensitivity to the standard neutron detection module HDPE box containing either (1) or (2) Helium-3 neutron detectors filled to three atmospheres of pressure. The testing demonstrated that embodiments of the invention have the equivalent neutron sensitivity of the (2) helium-3 neutron detector system, i.e., 4 cps/ng ($^{252}$CF). The addition of up to a total of 52 detectors showed further significant increases in sensitivity, in excess of 6 cps/ng $^{252}$Cf.

Experimental Setup

Experimental results were obtained using 72 inch active length He-3 and BF$_3$ proportional counters in a standard NDM box measuring 84 inches by 12 inches by 5 inches. The test source used was 20 µCi (±15%) of $^{252}$Cf shielded in a DNDO specified source shield consisting of 2.5 cm of lead, inside 6 mm of steel, inside 2.5 cm of HDPE. Because of the source strength uncertainty, benchmark measurements of 3-atmosphere, 2 inch diameter by 72 inch active length He-3 proportional counters were taken and used to compare the relative efficiencies of the BF$_3$ proportional counters.

Benchmark tests results of NDM box with He-3 proportional counters fill to 3-atmospheres pressure:
(1) He-3 tube in standard moderator box (centered in NDM box) 20,149±50 counts/3 minutes;
(2) He-3 tubes in standard moderator box 29,055±50 counts/3 minutes;
(3) He-3 tubes in standard moderator box 33,182±50 counts/3 minutes.

Results of 22 BF$_3$ proportional counters in NDM box (FIGS. 1 to 3):
(22) BF$_3$ tubes with steel cathodes in standard moderator box (FIGS. 1 to 3) 22,011±50 counts/3 minutes.

Embodiments of the invention achieve higher sensitivity, in comparison with earlier attempts to qualify BF$_3$ detectors for use in the standard NDM panel using He-3 deployed in many locations around the world. The object of those attempts was to find a drop-in replacement for the He-3 tubes without having to change the form-factor of the moderator box. The surprising results, in embodiments of the invention, come from the combination of detector tube size, aluminum cathode material, and fill pressure, in relation to the amount of moderating material around each detector tube and surrounding the cluster of detector tubes.

HDPE is one of the most common neutron moderators in use because of its high hydrogen content. The neutrons are moderated by the block of HDPE through elastic collisions with hydrogen nuclei.

In embodiments of the invention, the spatial distribution of detector tubes in the moderator increases the probability of moderation and detection of 1 MeV and higher energy neutrons, because the front rows of detector tubes act as a window allowing these neutrons to pass deeper into the moderator rather than being scattered out of the NDM or parasitically absorbed by the moderating material. Furthermore, since the energy dependence of the $^{10}$B cross section is of the 1/v type over a wide range of energies, the greatest efficiency is realized for thermal neutrons with energies equal to 0.025 eV, where the neutron absorption cross section of $^{10}$B is 3840 barnes. At neutron energies of 1 eV, this neutron absorption cross section drops to 607 barnes. Because of this strong dependency of the neutron absorption cross section on neutron energy, moderation of an incident neutron flux containing a range of neutron energies is necessary to achieve maximum detection efficiency.

The substantial increases in efficiency for an aggregate neutron detector using BF$_3$ proportional counters becomes more apparent only for diameters below approximately 0.75 inches. At diameters below 0.5 inches, the wall effect, which is already a factor in narrow BF$_3$ proportional counters, has a negative effect on the neutron detection efficiency of the detectors. The neutron absorption products, an alpha particle and a $^7$Li ion, have path lengths on the order of 1 cm. In proportional counters with dimensions that are generally less than 2 inches in diameter, the wall effect results from the collision of the reaction products with the wall before the incomplete deposition of their energy in the proportional counter gas, resulting in neutron events being detected as events that fall below the low level discriminator (LLD) setting of the detector electronics. In embodiments of the invention, although the wall effect is apparent in the output spectrum, there is a minimal decrease in efficiency due to some of the neutron events falling below the LLD level.

The efficiency of a BF3 proportional counter is proportional to the detector volume, the number of 10B atoms per unit volume; therefore by increasing the volume of the detector and the pressure of the gas, the efficiency of the detector increases, for a given neutron spectrum. However, larger diameter BF$_3$ neutron detector configurations have serious limitations in sensitivity due to the space constraints of the HDPE box and require much larger form factors to achieve equivalent sensitivities to He-3 based systems. This problem is solved by embodiments of this invention. Additionally, higher pressure BF$_3$ neutron detectors, e.g., 1.5 to 2 atmospheres fill pressures, require higher operation voltages which can create problems with current leakage across insulator surfaces in high humidity environments; higher pressure fills also do not offer the safety advantages of an ambient pressure gas fill, i.e., 0 PSIG.

With only 31 grams of BF$_3$, an embodiment of this invention achieves a 39% sensitivity gain over BF$_3$ systems built with three 2 inch diameter, 1 atmosphere filled tubes, or a total of 31 grams BF$_3$.

The minimum neutron sensitivity established by ANSI N42.43-2006 for radiation portal monitors (RPM's) is 2.5 cps/ng $^{252}$CF. An RPM system with an NDM containing one Helium-3 detector (2 inch diameter with 3 atmospheres of gas) has a sensitivity of about 2.7 cps/ng $^{252}$Cf, while a system containing an NDM with two Helium-3 detectors has a sensitivity of about 4.1 cps/ng $^{252}$Cf. It should be noted that the sensitivity of an NDM when tested as a stand-alone unit will be lower than when the NDM is installed and tested in an RPM system. In an RPM system, the steel NEMA box that houses the NDM and the gamma detection module (GDM) reflects neutrons into the NDM, and the plastics in the GDM provide additional neutron moderation. Embodiments of this invention using 26 aluminum proportional counters matched the sensitivity, within the margin of error, of a (2) He-3 detector NDM. By using aluminum proportional counters instead of stainless steel proportional counters, a substantial gain in efficiency is achieved due to the relative transparency of aluminum to neutrons compared to stainless steel; however, the gains are magnified when aluminum is used in an aggregate system in combination with the tube diameter range of 0.63 to 0.069 inches.

As mentioned above, simulations of embodiments of the invention have also been conducted. The simulation model was set up according to DHS specification where,

[a] The $^{252}$Cf neutron source was placed 2 m from the front of the poly module at the same height as the mid-point of the tubes. The $^{252}$Cf source (shown at 160 in the left hand panel of FIG. 27) is surrounded by a 1 cm steel shell contained in a 0.5 cm lead box surrounded by 2.5 cm of poly.

[b] The conversion factor for source activity was 1 nCi $^{252}$Cf emits 2,100 n/sec.

[c] Only the HDPE box embodiment (NDM) is included in the simulation model.

Figure 28:
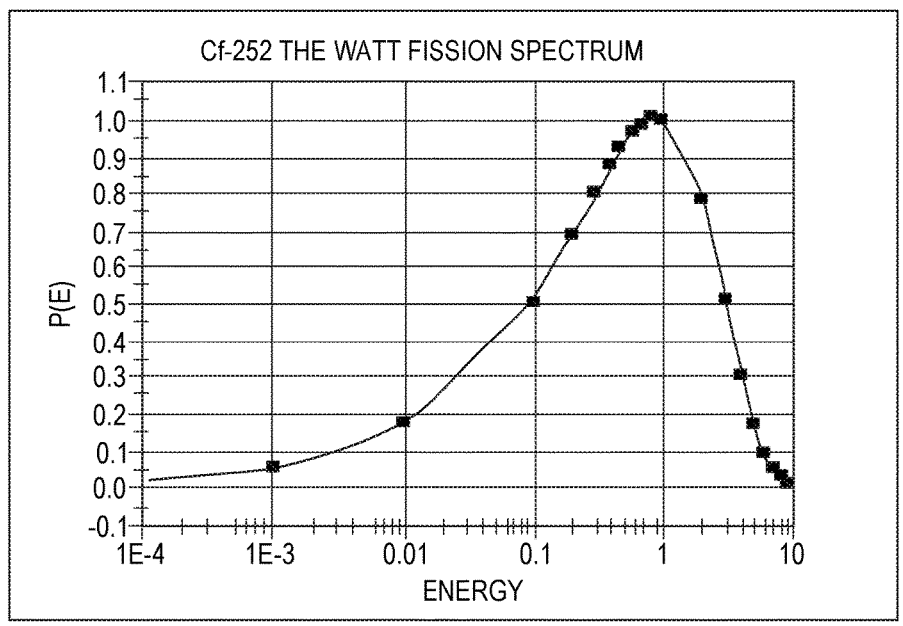
FIG. 28 shows a fission spectrum used in a simulation of the invention.

[d] The Cf-252 source was simulated by a Watt fission spectrum shown in FIG. 28.

The below table shows model simulations for efficiencies of (1), (2), and (3) 2 inch diameter $^3$He tubes in neutron detection modules (NDM's):

To account for factors (a) and (b), the simulation results should be multiplied 1.16. The correction for factors (a) and (b) allow for a more accurate comparison with published work that used only lead and HPDE in the source shield, and used the conversation factor for source activity of 1 gram $^{252}$Cf emits 2,300 n/sec.

To account for factor (c), the simulation results should be multiplied again by 1.15. Therefore, the table indicates a total multiplier factor of 1.31 which allows a more accurate comparison between published data on the sensitivity of a complete RPM system containing both the GDM and NDM in the steel NEMA box, and the sensitivity data for the NDM alone.

TABLE 1

Simulation results for NDMs based on 3-atm. He-3 tubes. Count-rates (cps) for 1 ng Cf-52 source placed at 2 m from the front face of the NDM.

| File-name | # of 3-atm He-3 tubes | Poly thickness in front of He-3 tubes (inches) | Tube configuration | Count-rate for 1 ng Cf-252 source at 2 m (cps) |
|---|---|---|---|---|
| HeB1 | 1 | 0.5 | Asymmetric | 2.025 |
| HeB3 | 1 | 1.0 | Asymmetric | 2.10 |
| HeB5 | 1 | 1.0 | Symmetric | 2.20 |
| HeB5p | 1 | Poly in cavity | Symmetric | 1.45 |
| HeB10 | 1 | 0.5 | Symmetric | 2.08 |
| HeB2 | 2 | 0.5 | | 3.11 |
| HeB4 | 2 | 1.0 | | 3.14 |
| HeB6 | 3 | 0.5 | Symmetric | 3.53 |

TABLE 2

Simulation results for NDMs based on 1-atm. BF$_3$ tubes. Count-rates (cps) for 1 ng Cf-252 source placed at 2 m from the front face of the NDM.

| File-name | # of BF$_3$ tubes | Poly thickness in front of tubes (inches) | Tube configuration | Count-rate for 1 ng Cf-252 source at 2 m (cps) |
|---|---|---|---|---|
| BF1 | 3 (1.0 atm) | 1.0 | 0.035" Al | 2.51 |
| BF2 | 3 (1.0 atm) | 1.0 poly inserts | 0.035" Al | 2.76 |
| BF3 | 3 (1.0 atm) | 1.0 | 0.02" steel | 2.38 |
| BF4 | 3 (1.0 atm) | 1.0 poly inserts | 0.02" steel | 2.62 |

Comparison of Simulation Results with Empirical Measurements

Measurements were made to compare the efficiency of a $^3$He single symmetric NDM, the 22 steel 0.585 ID tube BF3 models with a solid core, with poly beads in the cavity, and the 22 tube module with air in the cavity. The measurements showed a 9.2% advantage for the 22 tube BF$_3$ module using the solid core as compared a 2.85% advantage for a poly bead core. The 22 tube module with air in the cavity showed a 15% drop in efficiency from the poly bead core model. The simulation results in the table below show an 8% advantage for the poly bead core over the single symmetric $^3$He NDM, whereas the empirical measurements showed only a 2.85% advantage. This difference is a function of the ideal packing density of 0.74 for spherical beads used in the simulations as compared to the lower packing density of the irregular shaped HDPE pellets used in the experimental setup.

| File name | Number of BF3 tubes | Row spacing (in) | Column spacing (in) | Polybox dimensions (in) | Tube cavity | Count-rate (cps) for 1 ng Cf-252 |
|---|---|---|---|---|---|---|
| T3 FIGS. 1 to 3 | SK01939T 22, steel tubes ID = 0.585" | 0.834 | 1.063 | 12 × 5 | Solid poly | 2.39 |
| T3A FIGS. 1 to 3 | SK01939T 22, steel tubes ID = 0.585" | 0.834 | 1.063 | 12 × 5 | Air filled | 1.66 |
| T3B FIGS. 1 to 3 | SK01939T 22, steel tubes ID = 0.585" | 0.834 | 1.063 | 12 × 5 | Low density poly filled | 2.25 |
| HeB10 | 1 3-atm He-3 | Symmetric | | 12 × 5 | 0.5" poly in front | 2.08 |

Ratio efficiency: T3B/HeB10 = 2.25/2.08 = 1.08 or 8% improvement.

Tube diameter study with steel and aluminum tubes.

The goal of this study was to explore the variation of the NDM efficiency with the number of tubes. The ID's of the tubes were chosen so that the total weight of the BF3 in the NDM was less than 30 g. The study was performed with both steel and aluminum tubes. The thickness of the steel tubes was 0.02 inches and that of the aluminum tubes was 0.035 inches. The results are summarized in tables 3 and 4 and plotted in FIGS. 29 and 30.

TABLE 3

Tube diameter study using steel tubes. Count-rates (cps) for 1 ng Cf-252 source placed at 2 m from the front face of the NDM

| Model number | File name | # of tubes | Tube ID (inches) | Total BF3 volume (L) | Weight BF3 (g) | Efficiency (cps) |
|---|---|---|---|---|---|---|
| SK01939AP | Ap2 | 5 | 1.48 | 10.15 | 28.63 | 2.65 |
| SK01939AN | An2 | 7 | 1.251 | 10.15 | 28.64 | 2.75 |
| SK01939AL | A12 | 12 | 0.955 | 10.14 | 28.61 | 2.81 |
| SK01939V FIGS. 12-14 | La429 | 29 | 0.616 | 10.19 | 28.77 | 2.98 |
| SK01939V FIGS. 12-14 | La4 | 32 | 0.585 | 10.15 | 28.63 | 3.02 |
| SK01939AM | Am2 | 52 | 0.459 | 10.15 | 28.64 | 2.82 |

TABLE 4

Tube diameter study using Aluminum tubes. Count-rates (cps) for 1 ng Cf-252 source placed at 2 m from the front face of the NDM

| Model number | File name | # of tubes | Tube ID (inches) | Total BF3 volume | Weight BF3 (g) | Efficiency (cps) |
|---|---|---|---|---|---|---|
| SK01939AP | ZAL05 | 5 | 1.48 | 10.15 | 28.63 | 2.84 |
| SK01939A0N | ZAL07 | 7 | 1.251 | 10.15 | 28.64 | 2.98 |
| SK01939AL | ZAL12 | 12 | 0.955 | 10.14 | 28.61 | 3.09 |
| SK01939V FIGS. 12-14 | ZAL29 | 29 | 0.616 | 10.19 | 28.77 | 3.37 |
| SK01939V FIGS. 12-14 | ZAL32 | 32 | 0.585 | 10.15 | 28.63 | 3.42 |
| SK01939AM | ZAL52 | 52 | 0.459 | 10.15 | 28.64 | 3.46 |

The NDMs based on Al tubes have higher efficiencies as expected. The trend is the same as for steel tubes except that the 52-tube Al module has sensitivity slightly higher than that of the 32-tube NDM. In the case of the steel tube NDMs the 52-tube NDM had a lower efficiency than the 32-tube NDM.

TABLE 5

| File name | Model description | Spacing Row (in) | Spacing Column (in) | Tubes ID (in) | Tubes material | Polybox dimensions (in) | Extra Poly in front (in) | Count-rate (cps) |
|---|---|---|---|---|---|---|---|---|
| *Simulation results for comparison with a one tube He-3 module using Al tubes. Count-rates (cps) for 1 ng Cf-252 source placed at 2 m from the front face of the NDM.* | | | | | | | | |
| T6 FIGS. 1to3 | SK01939T 22 tubes | 0.834 | 1.063 | 0.616 | Al | 12 × 5 | 0.5 | 2.88 |
| T16 FIGS. 1 to 3 | SK01939T 22 tubes | 0.834 | 1.063 | 0.616 | Al | 12 × 5 | Air in 2.5" × 8" cavity | 2.05 |
| T17 FIGS. 1 to 3 | SK01939T 22 tubes | 0.834 | 1.063 | 0.616 | Al | 12 × 5 | P-beads in 2.5" × 8" cavity | 2.73 |
| *Simulation results for (2) He-3 equivalent* | | | | | | | | |
| Ly6 FIGS. 15-17 | SK01939AC: 26 Al tubes | 0.834 | 0.896 | 0.616 760torr | Al | 12 × 5 | 0.5 | 3.13 |
| La3 FIGS. 12-14 | SK01939V 34 steel tubes | 1 | 0.948 | 0.585 | Steel | 12 × 5 | 0.25 | 3.16 |
| *Simulation results for (3) He-3 tube equivalent* | | | | | | | | |
| LA12 FIG. 12-14 | Model SK01939V 31 Al tubes ID = 0.616 | 1 | 0.948 | | | 12 × 5 | Solid poly | 3.62 |
| *Simulations results for NDM exceeding (3) He-3 tube efficiency* | | | | | | | | |
| AGAL1 FIGS. 21-23 | SK01939AG: 46 Al tubes | 1.0 | 0.948 | 0.616 760torr | Al | 14 | 0.0 | 4.82 |
| AGAL5 FIGS. 18-20 | SK01939AG: 46 Al tubes | 1.0 | 0.948 | 0.616 760torr | Al | 12 | 0.0 | 4.34 |

| | | Simulation for NDM with a core filled with poly beads not solid poly. | | | | |
|---|---|---|---|---|---|---|
| File name | Number of BF3 tubes | Row spacing (in) | Column spacing (in) | Polybox dimensions (in) | Tube cavity filling | Count-rate (cps) for 1 ng Cf-252 at 2 m |
| AR1 FIGS. 24-26 | Model SK01939AR 34 Al tubes ID = 0.616 | 1 | 0.948 | 12 × 5 | Poly beads | 3.52 |

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

The invention claimed is:

1. A neutron detector module, comprising:
a container;
a distribution of proportional counters positioned in a defined array in said container, each of the proportional counters including a supply of a neutron sensitive gas for reacting with neutrons, said reacting generating ionizing reaction products, and wherein the proportional counters include a multitude of tubes, each of the tubes having a diameter between 0.50 inch and 1.00 inch; and
a multitude of electrical conductors, each of the conductors extending into one of the proportional counters, wherein said ionizing reaction products generate electric current pulses in the electrical conductors; and wherein:
in said defined array, the proportional counters are positioned in a plurality of parallel rows; centers of the parallel rows are spaced apart between about 0.834 and 1.0 inch; and within each of the rows, centers of the proportional counters are spaced apart between about 0.896 and 1.063 inches.

2. The neutron detector module to claim 1, wherein the neutron sensitive gas is $BF_3$, and the mass of the $BF_3$ gas in each of the proportional counters is equal to or less than one gram.

3. The neutron detector module according to claim 2, wherein the pressure in each of the proportional counters is equal to or less than 105 kPa (absolute) at 20° C.

4. The neutron detector module according to claim 1, wherein each of the tubes has a diameter equal to or less than 0.75 inch.

5. The neutron detector module according to claim 4, wherein each of the tubes has a diameter between 0.63 inch and 0.69 inch.

6. The neutron detector module according to claim 4, wherein each of the tubes has a sidewall thickness between 0.015 inch and 0.038 inch.

7. The neutron detector module according to claim 1, wherein said multitude of tubes includes between 22 and 54 tubes.

8. The neutron detector module according to claim 1, further comprising a neutron moderator material inside said container for moderating neutrons in said container, and wherein:

the neutron moderator material comprises pellets of the neutron moderator material positioned in the container, around the proportional counters; and
the pellets fill the container, between and around the distribution of proportional counters.

9. The neutron detector according to claim 1, further comprising a base neutron moderator material inside said container for moderating neutrons in the container, and wherein:
the base neutron moderator material defines a multitude of longitudinal openings; and
the proportional counters are held in said longitudinal openings in said defined array.

10. A method of operating a neutron detector module comprised of a container and a distribution of proportional counters positioned in a defined array in the container, the method comprising:
locating the detector module adjacent a source of neutron; and
using the distribution of proportional counters to detect some of the neutrons from said source, each of the proportional counters including a neutron gas for reacting with the neutrons, said reacting generating ionizing reaction products, and wherein;
the proportional counters include a multitude of tubes, each of the tubes having a diameter between 0.50 inch and 1.00 inch; and
in said defined array, the proportional counters are positioned in a plurality of parallel rows; centers of the parallel rows are spaced apart between about 0.834 and 1.0 inch; and within each of the rows, centers of the proportional counters are spaced apart between about 0.896 and 1.063 inches.

11. The method according to claim 10, wherein the neutron sensitive gas is $BF_3$, and the mass of the $BF_3$ gas in each of the proportional counters is equal to or less than one gram.

12. The method according to claim 10, wherein each of the tubes has a diameter between 0.5 inch and 0.75 inch.

13. The method according to claim 10, wherein
in said defined array, the proportional counters are positioned in a plurality of parallel columns; and
centers of the columns are spaced apart between about 0.896 and 1.063 inches.

14. The method according to claim 10, wherein beads of neutron moderator material fill the container, between and around the proportional counters in the neutron detector module.

15. A neutron detector assembly comprising:
a distribution of proportional counters positioned in a defined array;
at least one support member holding the proportional counters in said defined array;
each of the proportional counters including a supply of a neutron sensitive gas for reacting with neutrons, said reacting generating ionizing reaction products, and wherein the proportional counters include a multitude of tubes, each of the tubes having a diameter between 0.50 inch and 1.00 inch; and a multitude of electrical conductors, each of the conductors extending into one of the proportional counters, wherein said ionizing reaction products generate electric current pulses in the electrical conductors; and wherein:

in said defined array, the proportional counters are positioned in a plurality of parallel rows; centers of the parallel rows are spaced apart between about 0.834 and 1.0 inch; and within each of the rows, centers of the proportional counters are spaced apart between about 0.896 and 1.063 inches.

16. The neutron detector assembly according to claim 15, wherein the neutron sensitive gas is $BF_3$, and the mass of the $BF_3$ gas in each of the proportional counters is equal to or less than one gram.

17. The neutron detector assembly according to claim 16, wherein:

in said defined array, the proportional counters are positioned in a plurality of columns.

18. The neutron detector assembly according to claim 17, wherein each of the tubes has a diameter between 0.63 inch and 0.69 inch.

19. The neutron detector assembly according to claim 15, further comprising a container holding the distribution of proportional counters in the defined array, and a quantity of pellets of neutron moderator material filling the container, between and around the proportional counters to moderate neutrons in the neutron detector assembly.

20. The neutron detector module according to claim 1, wherein each of the tubes of the proportional counters has a length between 14 and 81 inches.

* * * * *